Jan. 13, 1942. E. G. GLICK 2,270,002
SPEED CONTROL MECHANISM
Filed July 7, 1939 2 Sheets-Sheet 2
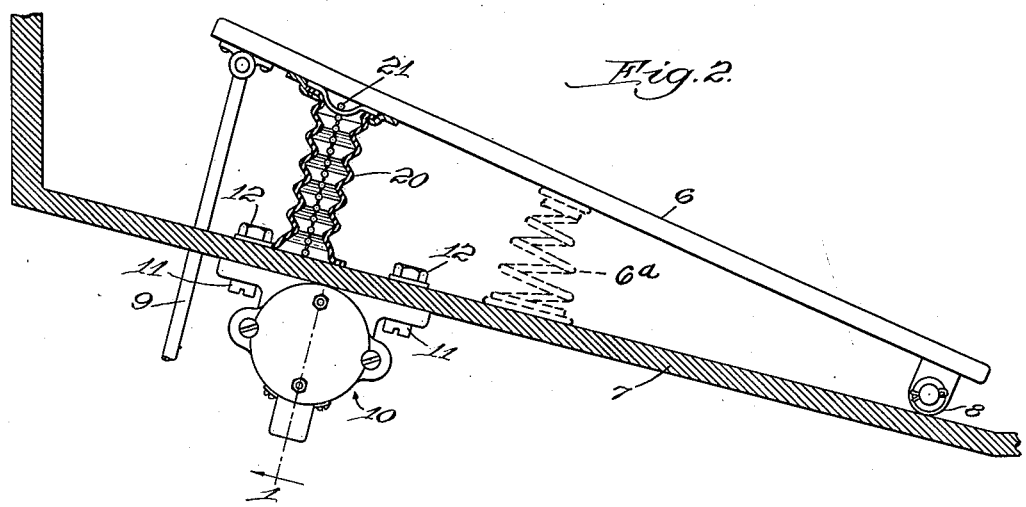
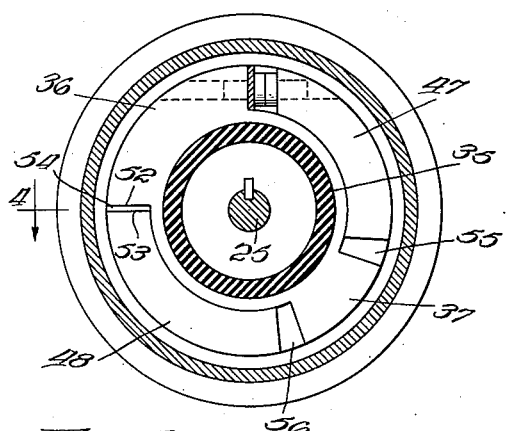
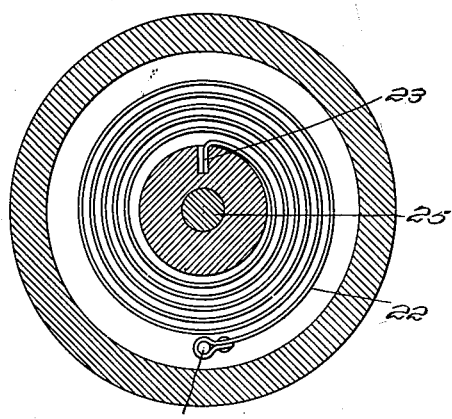
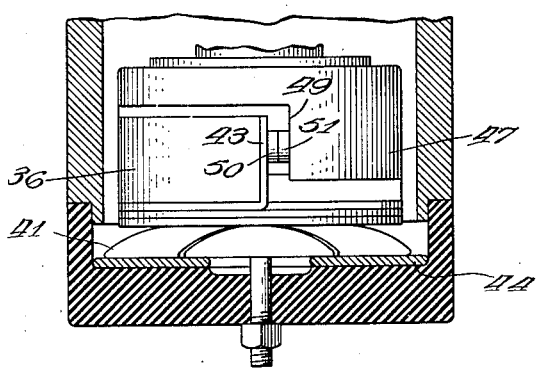
Inventor:
Edward G. Glick.
By Chritton, Wiles, Davis, Hirsch & Dawson.
Attys.

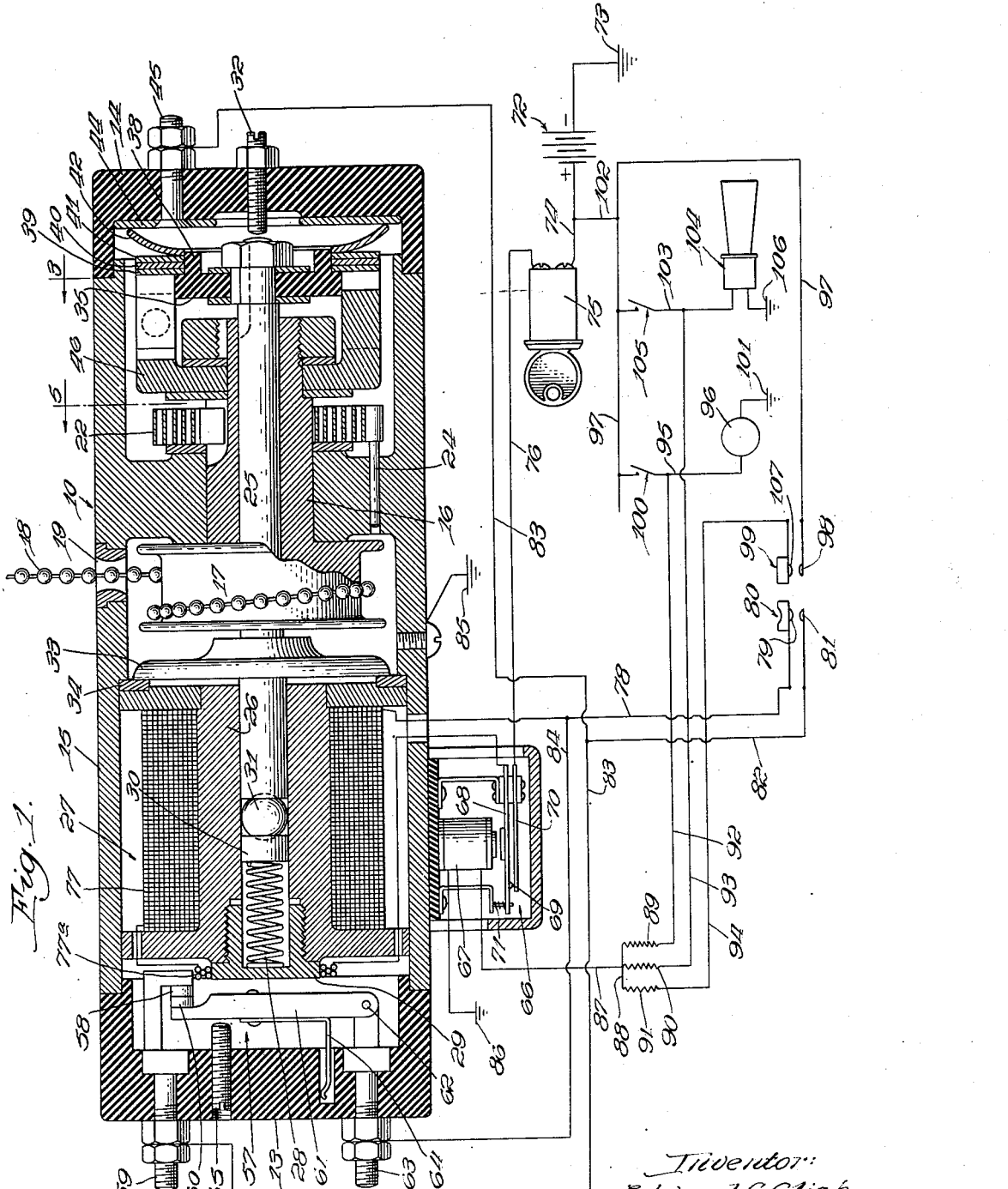

Patented Jan. 13, 1942

2,270,002

UNITED STATES PATENT OFFICE 2,270,002

SPEED CONTROL MECHANISM

Edward G. Glick, Chicago, Ill., assignor of one-half to Rembe McCormick, Chicago, Ill.

Application July 7, 1939, Serial No. 283,306

22 Claims. (Cl. 192—3)

My invention relates more particularly to speed control mechanism for automobiles.

One of my objects is to provide mechanism whereby, by a simple operation, the driver of an automobile may cause the accelerator thereof, (usually provided in the form of a pedal) to become set in any position to which it is actuated by the operator for continuing the operation of the automobile at the attained speed, thereby eliminating the necessity of holding the pedal down against its tendency to rise, with resultant ease and comfort to the driver especially on long runs.

Another object of the invention is to make such provision for the release of such setting mechanism that it will not only make for simplicity in the manipulation of the car but also for maximum safety; and to this end not involve any complications of manipulation which, under the stress of driving conditions, might lead to a lack of perfect control of the automobile; and other objects as will be manifest from the following description.

Referring to the accompanying drawings:

Figure 1 is a view in longitudinal sectional elevation of my speed setting mechanism showing it as incorporated in a desirable electrical circuit arrangement with certain parts commonly provided on automobiles.

Figure 2 is a view in vertical sectional elevation through the floor board of an automobile adjacent the pedal accelerator which latter, together with my speed setting mechanism, are illustrated in elevation.

Figure 3 is a section taken at the line 3 on Fig. 1 and viewed in the direction of the arrow.

Figure 4 is a broken sectional view taken at the line 4 on Fig. 3 and viewed in the direction of the arrow; and Figure 5, a section taken at the line 5 of Fig. 1 and viewed in the direction of the arrow.

In accordance with the particular illustrated embodiment of my invention, the speed setting mechanism is associated with the usual pedal accelerator represented at 6 of an automobile located above the floor board 7 and rockably supported at one end thereon at 8.

The opposite end of the pedal 6, in accordance with common practice, connects by a rod 9 with the carburetor control, not shown, for the engine of an automobile, and spring means represented at 6ª are provided which urge the pedal to the raised, normal, idling position shown in Fig. 2, the speed at which the automobile is driven increasing as the pedal is depressed by the operator.

Located beneath the floor board 9 is a casing 10 shown as a cylinder secured at ears 11 thereon to the floor board 7 as by the bolts 12.

The casing 10 is shown as comprising end sections 13 and 14 of di-electric material and an intermediate open-ended shell section 15 secured to the end sections 13 and 14 in any suitable way.

Journalled in the casing-section 15 is a sleeve 16 having a pulley 17 integral therewith, and on which one end of a chain 18, connected with the pulley, is wound, the other end of the chain extending upwardly through an opening 19 in the casing-section 15 and an opening (not shown) in the floor board 7 and through a flexible bellows casing 20, located between the floor board 7, to the pedal 6, at which it is connected, as indicated at 21.

A coil spring 22 connected at one end to the sleeve 16, as indicated at 23, and at its other end to the casing-section 15, by means of a pin 24, urges the sleeve 16 and pulley 17 clockwise in Fig. 5 and holds the chain 18 taut at all times.

When the operator depresses the pedal 6, the spring 22 in rotating the sleeve and pulley winds the chain 18 on the pulley 17; and when the operator releases pressure on the pedal 6, the pedal rises and rotates the pulley and sleeve assembly clockwise in Fig. 5 against the resistance of the spring 22; the spring 22 being weaker than the spring means above referred to which operates to raise the pedal 6.

The sleeve and pulley assembly contains a shaft 25 on which the sleeve and pulley assembly is rotatable, the shaft 25 extending at its opposite ends beyond this assembly.

One end of the shaft 25 rotates and slides in the core 26 of an electromagnet 27 and is yieldingly urged to the right in Fig. 1 by a coil spring 28 interposed between a socket plug 29 on the core 26 and a plunger 30 in the core, with a ball 31 interposed between the plunger 30 and the shaft 25 to reduce friction. An adjustable stop, in the form of a screw 32, is provided in the casing-section 14 to limit lengthwise movement of the shaft 25 under the action of the spring 28.

This end of the shaft 25 has rigid therewith a disk-like armature 33 opposing an end of the core 26, with a stop ring 34 of non-magnetic material, as for example bronze, interposed between these parts to prevent the armature 17 from contacting the magnetic portion of the core when the magnet 27 is energized. The other end of the shaft 25 has rigidly fixed thereto a disk 35 of di-electric material having diametrically opposed radial segments 36 and 37 projecting beyond a face of the disk 35.

The disk 35 is formed with an annular flange 38 surrounded by, and supporting, three friction washers 39, 40, and 41 and a spring washer 42, as for example of phosphor bronze, joined thereto, the washer 39 being provided with a tongue 43, shown as cut therefrom, which overlaps a side of the segment 36. The washer 42 bears at its resilient periphery against a contact ring 44 secured to the casing end 14, as by a binding post 45.

Fixedly secured to the adjacent end of the sleeve 16 is a disk 46 having diametrically opposed segments 47 and 48 which alternate with the segments 36 and 37, the segments 47 and 48 extending into the spaces between the segments 36 and 37.

The tongue 43 of the washer 39 and the opposing end face 49 of the segment 47 are provided with opposed electrical contacts 50 and 51, respectively; and the segments 36, 37, 47, and 48 are of such lengths circumferentially that when the contacts 50 and 51 are mutually in engagement, the face 52 of the segment 36 will be spaced from the adjacent face 53 of the segment 48, as for example about .02 of an inch as represented at 54, the segment 37 being freely spaced at its ends from the adjacent ends of the sections 47 and 48, are represented at 55 and 56.

The arrangement and disposition of the several segments referred to are such, as shown and described, that the pulley, sleeve, and disk assembly may have a limited rotary movement relative to the shaft 25 and its disk 35, to engage the contacts 50 and 51 with each other in the rotation of the pulley, sleeve, and disk assembly counterclockwise in Fig. 5 and to disengage these contacts in the initial rotation of the pulley, sleeve, and disk assembly clockwise in Fig. 5; it being understood that the spring 28 operates to cause the spring washer 42 to yieldingly press against the contact ring 44 and through the frictional engagement of the washer assembly, of which washer 42 is one element, with the disk 35, retards rotation of the shaft 25 and the parts carried thereby in the initial rotation of the pulley, sleeve, and disk assembly in either direction.

The mechanism shown also comprises an electrical contact device 57 located in the casing 10 and comprising a stationary contact 58 secured to the casing-section 13 by a binding post 59, and a movable contact 60 secured to a lever 61 of magnetic material pivoted at 62 to a binding post 63 on the casing-section 13 and opposing an end of the core 26. A spring 64 yieldingly holds the movable contact 60 out of engagement with the contact 58, in which position the lever 61 bears against a stop 65 on the casing-section 13.

The mechanism also comprises a relay switch 66 secured to the casing 15 and comprising an electromagnet 67, a flexible armature 68 having a contact point 69 and a flexible contact strip 70 disposed alongside the armature 68. A spring 71 normally urges the armature 68 into engagement at its contact 69 with the contact strip 70; the arrangement of the parts being such that the circuit is normally closed at the contacts of the switch.

It may here be stated that according to the particular arrangement shown, and as hereinafter more fully described, the speed setting mechanism operates automatically upon removing the pressure of the foot against the accelerator pedal 6 (assuming the operator has energized the electromagnet 27 as hereinafter described) to set the pedal substantially in the position to which it was depressed by the foot pressure, by attracting the armature 33 to the electromagnet 27 and clamping it against the ring 34, thus preventing rotation of the shaft 25 and the parts rigid therewith and preventing the pulley, sleeve, and disk assembly from rotating after engaging the contact 51 with the contact 50; and the pedal 6 is released to permit it to rise and be operated in the conventional way, either by the operator exerting pressure on the pedal 6 to move it a slight distance, or by applying the brakes on the car which, when applied, automatically energize the stop light as commonly provided, or by opening the ignition switch, or by energizing the horn on the automobile, or by actuating a switch especially provided for this unsetting purpose. Accordingly, I have shown and will now describe circuit arrangements whereby such selective release of the pedal setting mechanism may be effected.

The battery forming the source of electric power for the mechanism and shown as the usual storage battery of an automobile, is represented at 72, one terminal thereof being grounded as represented at 73. The other terminal of the battery connects, by a wire 74 with one of the terminals of the ignition switch 75 of the automobile, the other terminal of this switch being connected by a wire 76 with the stationary contact 70 of the relay switch 66. One of the terminals of the coil 77 of the electromagnet 27 connects by a wire 78 with the movable contact 79 of a push button switch 80 which may be located at any place on the automobile accessible to the operator while driving the car. The other terminal of the coil 77 is connected with one terminal of a small coil 77ª surrounding that end of the core 26 which opposes the lever 61 and is preferably provided to augment the action of the main coil 77 for insuring the movement of the lever 61 to a position in which the contact 60 engages the contact 58 when the electromagnet 27 is energized. The other terminal of the coil 77ª connects with the movable contact 68 of the switch 66. The stationary contact 81 of the switch 80 connects with the wire 82, which in turn is connetced with a wire 83, connecting together the binding posts 45 and 59. The binding posts 63 connects by a wire 84 with the wire 78 and the casing 15 is grounded as represented at 85.

One terminal of the coil 67 of relay switch 66 is grounded as represented at 86. The other terminal of this coil connects by wires 87 and 88 with one end of each of three resistance coils 89, 90, and 91, the other ends of which connect with wires 92, 93, and 94, respectively.

The wire 92 connects with a wire 95, which in turn connects one of the terminals of the brake controlled stop light of the automobile and represented at 96 with a wire 97, the wire 97 leading from the stationary contact 98 of a push button switch represented at 99, the switch for the stop light, and operated by the brake in accordance with common practice, being shown at 100. The other terminal of the stop light 96 is grounded, as represented at 101, and the wire 97 is connected with the wire 74 by a wire 102.

The wire 93 connects with a wire 103, which connects one of the terminals of the electric horn of the automobile, represented at 104, with the wire 97, the horn switch, represented at 105, as commonly provided, being located in the wire 103. The other terminal of the horn 104 is grounded, as represented at 106.

The wire 94 connects with a movable contact 107 of the push button switch 99.

In the normal condition of the mechanism the switches 57, 80, 99, 100, and 105 are open, the switch 66 is closed, the electromagnet 27 is deenergized and the shaft 25 bears against the stop 32 under the action of the spring 28, in which position of the parts the armature 33 is spaced from the stop ring 34.

In the normal or conventional operation of the automobile (in which operation the speed setting mechanism is inactive) the speed at which the automobile is driven is controlled wholly by the pressure of the foot of the operator on the pedal 6. As the pedal is depressed, the pulley, sleeve, and disk assembly are rotated clockwise in Fig. 5 by the spring 22 which moves the contact 51 out of engagement with the contact 50 and the segment 48 at its surface 53 engages the opposing surface 52 of the segment 36, the shaft 25 with the parts carried thereby thereupon rotating with the sleeve, pulley, and disk assembly, the chain 18 winding upon the pulley 17 and maintaining it taut at all times. When the pedal 6 is permitted to rise, the pulley, sleeve, and disk assembly are rotated counterclockwise in Fig. 5 against the action of the spring 22 which holds the chain taut. In this operation the contact 51 moves into engagement with the contact 50, whereupon the shaft 25, together with the parts connected therewith, are rotated with the pulley, sleeve, and disk assembly. As the circuit in which the contacts 50 and 51 are interposed is open, the push button switch 80 being open, the setting mechanism merely idles in the movements of the pedal 6, as stated.

To set the pedal 6 substantially in any position to which it has been depressed by the operator to maintain the attained speed while permitting the operator to remove his foot therefrom, the operator presses the push button switch 80, and, while in depressed condition, eases the foot pressure on the pedal 6. In doing this, current is supplied to the electromagnet 27 which draws the armature 33 into tight engagement with the stop ring 34 (the shaft 25, together with the parts carried thereby, shifting to the position shown in Fig. 1) preventing the pedal 6 from rising, the energizing of the electromagnet 27 also operating to close the switch 57. Current continues to be supplied to the electromagnet 27 after the operator releases the push button 80, through the circuit in which the switch 57 is interposed, until the circuit through the electromagnet 27 is opened by energizing the relay magnet 66 interposed in the circuit in which the electromagnet 27 is located, or by slightly depressing the pedal 6 to permit the contacts 50 and 51 to become separated under the action of the spring 22, or by opening the ignition switch 75, whereupon the armature 33 is forced away from the electromagnet 27 by the spring 28, thus permitting pedal 6 to rise and resume conventional functioning.

The circuits thus controlling the operation of the setting mechanism are as follows:

When the push button switch 80 is actuated, as stated, current flows from the battery 72 through the ignition switch 75, wire 76, relay switch 66 to coils 77a and 77 of the electromagnet 27, thence through wire 78 to the push button switch 80, through the wire 82 to wire 83, binding post 45, contact plate 44, the washer assembly, tongue 43, contacts 50 and 51, and thence through the metallic parts to the casing and to ground at 85 and back to battery 72. This energizes the electromagnet 27 and clutches pulley, sleeve, and disk assembly and the shaft 25 and the parts connected therewith, against rotation, thereby holding the pedal 6 in depressed condition; it being understood that in this position of the parts the spring means above referred to which operate to raise the pedal 6 is active and through the chain and pulley arrangement firmly holds the contact 51 in engagement with the contact 50.

Simultaneously, with the attracting of the armature 33 by the magnet 27, the armature 61 is attracted thereby closing the switch 57 which establishes a holding circuit for the electromagnet 27 which functions regardless of the operator opening the push button switch 80; the current flowing from the battery 72 to the coils 77a and 77, through the relay switch 66, as above explained, and thence through wires 78 and 84, binding post 63, switch 57, binding post 59, wire 83, binding post 45, and thence to ground at 85 and back to battery 72.

To release the setting mechanism to resume the normal or conventional operation of the pedal accelerator, the electromagnet 27 is deenergized either by disengaging the contacts 50 and 51 by the operator pressing down on the pedal 6, or by breaking the circuit through the relay switch 66 by either closing the circuit at the push button 99 or at either switch 100 and 105, or opening the ignition switch 75.

As will be understood, the setting mechanism is released by depressing the pedal 6 inasmuch as in such operation the spring 22 is permitted to rotate the pulley, sleeve, and disk assembly clockwise in Fig. 5 which moves the contact 51 out of engagement with the contact 50 and thus breaks the main circuit in which the electromagnet 27 is interposed.

The circuit by which the relay 66 is operated when the push button switch 99 is actuated is as follows: battery 72, wire 74, wires 102 and 97, switch 99, wire 94, resistance unit 91, wires 88 and 87 to relay coil 67, and thence back to the battery 72 through ground 86.

The circuit through which the relay switch 66 is opened upon closing the stop light switch 100 is as follows: battery 72, wires 74, 102, 97, switch 100, wire 92, resistance unit 89, wires 88 and 87 to relay electromagnet 67 and thence through ground 86 to the battery.

The circuit through which the relay switch 66 is opened by closing the horn switch 105 is as follows: battery 72, wires 74, 102, 97, switch 105, wires 103 and 93, resistance unit 90, wire 87 to electromagnet 67 and thence through ground 86 to battery.

As the ignition switch 75 is in circuit with the contacts of the relay switch 66, the opening of the switch 75 breaks the circuit at this point and current ceases to flow to the electromagnet 27.

The purpose of the resistance units 89, 90, and 91 is as follows: the coil 67 of the relay switch 66 would be a low voltage coil operating at say one volt, the usual voltage of a usual storage battery being about six volts. Each of these resistance units is proportioned to reduce the six volt line current to about one volt to avoid energizing the horn 104 and stop light 96 when the switch 99 is moved to closed position, or energizing the horn 104 when the stop light switch 100 is moved to closed position, or energizing the stop light 96 when the horn switch 105 is moved to closed position; it being noted that by using the resistance units as stated the electrical impulse, upon closing the stop light or horn switches 100 and 105 or the push button switch 99, will not be of sufficient intensity to back up through the other two of the resistance units and actuate the horn and stop light if the push button switch is closed, or the horn, if the stop light switch is closed, or the stop light, if the horn switch is closed.

While I have illustrated and described a particular embodiment of my invention, I do not wish to be understool as intending to limit it thereto, as the same may be variously modified and altered and the invention embodied in other forms of structure without departing from the spirit of my invention.

What I claim as new and desire to secure by Letters Patent, is:

1. Speed-setting mechanism for the accelerator of an automobile comprising electrical means for holding said accelerator in the position to which it is actuated, said means being normally inactive in the movements of the accelerator, controllable means by which said electrical means are rendered active, and means comprising a single switch device by which said first-named means are restored to inactive condition in which said accelerator is operable free of restraint from said first-named means.

2. Speed-setting mechanism for the accelerator of an automobile comprising electrical means for holding said accelerator in the position to which it is actuated, said means being normally inactive in the movements of the accelerator, controllable means by which said first-named means are rendered active, and means comprising a single switch device controlled by the operator of the automobile for restoring said electrical means to inactive condition in which said accelerator is operable free of restraint from said first-named means.

3. Speed-setting mechanism for the accelerator of an automobile having a brake comprising means for holding said accelerator in the position to which it is actuated, said means being normally inactive in the movements of the accelerator, controllable means by which said first-named means are rendered active, and means comprising a single switch device controlled by the brake for restoring said first-named means to inactive condition in which said accelerator is operable free of restraint from said first-named means.

4. Speed-setting mechanism for the accelerator of an automobile comprising means for holding said accelerator in the position to which it is actuated, said means being normally inactive in the movements of the accelerator, controllable means by which said first-named means are rendered active, and electrically-controlled means for restoring said first-named means to inactive condition in which said accelerator is operable free of restraint from said first-named means comprising an electrical switch separate from said controllable means the sole function of which is to effect such restoration.

5. Speed-setting mechanism for the accelerator of an automobile comprising means for holding said accelerator in the position to which it is actuated, said means being normally inactive in the movements of the accelerator, controllable means by which said first-named means are rendered active, and means controlled by said accelerator and operative upon moving said accelerator from the position in which it is held by said first-named means toward speed-increasing position, for restoring said first-named means to inactive condition.

6. Speed-setting mechanism for the accelerator of an automobile comprising relatively movable cooperating electrical contacts, means operating in the movements of said accelerator in opposite directions to cause said contacts to engage and disengage, respectively, said contacts engaging in the movement of said accelerator toward engine-idling position, and means, including said contacts, operative, when actuated, to set said accelerator substantially in the position occupied by it upon actuation of said last-named means.

7. Speed-setting mechanism for the accelerator of an automobile comprising relatively movable cooperating electrical contacts, means operating in the movements of said accelerator in opposite directions to cause said contacts to engage and disengage, respectively, said contacts engaging in the movement of said accelerator toward engine-idling position, means, including said contacts, operative, when actuated, to set said accelerator substantially in the position occupied by it upon actuation of said last-named means, and controllable means operative to release said first-named means.

8. Speed-setting mechanism for the accelerator of an automobile comprising relatively movable cooperating electrical contacts, means operating in the movements of said accelerator in opposite directions to cause said contacts to engage and disengage, respectively, said contacts engaging in the movement of said accelerator toward engine-idling position, and means including said contacts and electrically operated brake mechanism, operative when actuated, to set said accelerator substantially in the position occupied by it upon actuation of said last-named means.

9. Speed-setting mechanism for the accelerator of an automobile comprising relatively movable cooperating electrical contacts, means operating in the movements of said accelerator in opposite directions to cause said contacts to engage and disengage, respectively, said contacts engaging in the movement of said accelerator toward engine-idling position, means including said contacts and electrically operated brake mechanism, operative when actuated, to set said accelerator substantially in the position occupied by it upon actuation of said last-named means, and controllable means for deenergizing said brake mechanism.

10. Speed-setting mechanism for the accelerator of an automobile comprising a sleeve member, a shaft member in said sleeve member, one of said members being a drive member, both of said members being rotatable and said drive member having limited rotation relative to the other of said members, means rotating said drive member in one direction in the movement of said accelerator in one direction and in the opposite direction in the reverse movement of said accelerator, electrical contacts on said members engageable together when said drive member is rotated in one direction relative to the other of said members and separated when said drive member is rotated in the reverse direction, and means, including said contacts, operative, when actuated, to set said accelerator substantially in the position occupied by it upon the actuation of said last-named means.

11. Speed-setting mechanism for the accelerator of an automobile comprising a sleeve member, a shaft member in said sleeve member, one of said members being a drive member, both of said members being rotatable and said drive member having limited rotation relative to the other of said members, means rotating said drive member in one direction in the movement of said accelerator in one direction and in the opposite direction in the reverse movement of said accelerator, electrical contacts on said members engageable together when said drive member is rotated in one direction relative to the other of said members and separated when said drive member is rotated in the reverse direction, means, including said contacts, operative, when actuated, to set said accelerator substantially in the position occupied by it upon the actuation of said last-named means, and controllable means operative to release said second-named means.

12. Speed-setting mechanism for the accelerator of an automobile comprising a sleeve member, a shaft member in said sleeve member, one of said members being a drive member, both of said members being rotatable and said drive member having limited rotation relative to the other of said members, means actuated by said accelerator for rotating said drive member in one direction in the movement of said accelerator toward engine-idling position, a spring tending to rotate said drive member in the opposite direction and rotating the latter in the movement of said accelerator toward engine-speed-increasing position, electrical contacts on said members engageable together when said drive member is rotated in one direction relative to the other of said members and separated when said drive member is rotated in the reverse direction, and means, including said contacts, operative, when actuated, to set said accelerator substantially in the position occupied by it upon the actuation of said last-named means.

13. Speed-setting mechanism for the accelerator of an automobile comprising a sleeve member, a shaft member in said sleeve member, one of said members being a drive member, both of said members being rotatable and said drive member having limited rotation relative to the other of said members, a flexible element wound on said drive member and operatively engaging said accelerator and by which said drive member is rotated in one direction when said accelerator moves toward engine-idling position, a spring operative to move said drive member in the opposite direction, electrical contacts on said members engageable together when said drive member is rotated in one direction relative to the other of said members and separated when said drive member is rotated in the reverse direction, and means, including said contacts, operative, when actuated, to set said accelerator substantially in the position occupied by it upon the actuation of said last-named means.

14. Speed-setting mechanism for the accelerator of an automobile comprising a sleeve member, a shaft member in said sleeve member, one of said members being a drive member, both of said members being rotatable and said drive member having limited rotation relative to the other of said members, means rotating said drive member in one direction in the movement of said accelerator in one direction and in the opposite direction in the reverse movement of said accelerator, electrical contacts on said members engageable together when said drive member is rotated in one direction relative to the other of said members and separated when said drive member is rotated in the reverse direction, and braking means operative, when actuated, to engage the one of said members other than said drive member.

15. Speed-setting mechanism for the accelerator of an automobile comprising a sleeve member, a shaft member in said sleeve member, one of said members being a drive member and the other thereof lengthwise movable relative to the other of said members, both of said members being rotatable and said drive member having limited rotation relative to the other of said members, means rotating said drive member in one direction in the movement of said accelerator in one direction and in the opposite direction in the reverse movement of said accelerator, electrical contacts on said members engageable together when said drive member is rotated in one direction relative to the other of said members and separated when said drive member is rotated in the reverse direction, and an electromagnet the armature of which is carried by the one of said members which is movable lengthwise, said magnet when energized operating through said armature to act as a brake engaging said last-referred-to member.

16. Speed-setting mechanism for the accelerator of an automobile comprising electrical means for holding said accelerator in the position to which it is actuated, said means being normally inactive in the movements of the accelerator and comprising an electromagnet, a rotary armature for said magnet, connecting means between said accelerator and armature operative when said magnet is energized to control the return of the accelerator, after actuation thereof, toward idling position and a switch controlling the energizing of said magnet, and controllable means by which said magnet is de-energized for restoring said electrical means to inactive condition.

17. Speed-setting mechanism for the accelerator of an automobile comprising electrical means for holding said accelerator in the position to which it is actuated, said means being normally inactive in the movements of the accelerator and comprising an electromagnet, an armature for said magnet, a movable shaft controlling said armature, means connecting said shaft and accelerator and a switch controlling the energizing of said magnet, and controllable means by which said magnet is de-energized for restoring said electrical means to inactive condition.

18. Speed-setting mechanism for the accelerator of an automobile comprising electrical means for holding said accelerator in the position to which it is actuated, said means being normally inactive in the movements of the accelerator and comprising an electromagnet, an armature for said magnet, connecting means between said accelerator and armature operative when said magnet is energized to control the return of the accelerator, after actuation thereof, toward idling position, a switch controlling the energizing of said magnet and a relay in circuit with said magnet, and controllable means for energizing said relay to break the circuit through said magnet for restoring said electrical means to inactive condition.

19. Speed-setting mechanism for the accelerator of an automobile comprising electrical means for holding said accelerator in the position to which it is actuated, said means being normally inactive in the movements of the accelerator and comprising an electromagnet, a holding coil associated with said magnet, a main armature for said magnet and controlling said accelerator, a switch controlling said magnet, and an armature-controlled switch the armature of which cooperates with said holding coil to maintain the flow of current through said magnet, and controllable means by which current through said holding coil is interrupted for restoring said means to inactive condition.

20. Speed-setting mechanism for the accelerator of an automobile comprising electrical means for holding said accelerator in the position to which it is actuated, said means being normally inactive in the movements of the accelerator, controllable means by which said electrical means are rendered active, and means operable from a single source by which said first-named means are restored to inactive condition in which said accelerator is operable free of restraint from said first-named means.

21. Speed-setting mechanism for the accelerator of an automobile comprising a rotary member, a flexible element wound on said rotary member and operatively engaging said accelerator, means for driving said rotary member in a direction to wind said element thereon in the movement of said accelerator out of engine-idling position, and controllable means for holding said rotary member against rotation in a direction to permit return of said accelerator toward engine-idling position.

22. Speed-setting mechanism for the accelerator of an automobile comprising a rotary member, a flexible element wound on said rotary member and operatively engaging said accelerator, means for driving said rotary member in a direction to wind said element thereon in the movement of said accelerator out of engine-idling position, and electrically controlled means for holding said rotary member against rotation in a direction to permit return of said accelerator toward engine-idling position.

EDWARD G. GLICK.